United States Patent Office 3,301,218
Patented Jan. 31, 1967

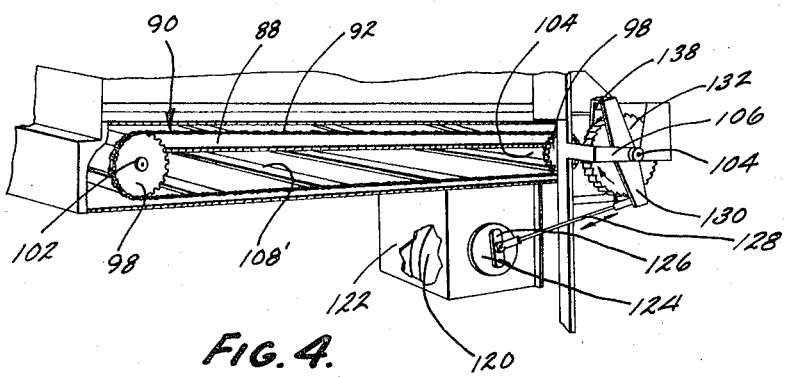
FIG. 4.
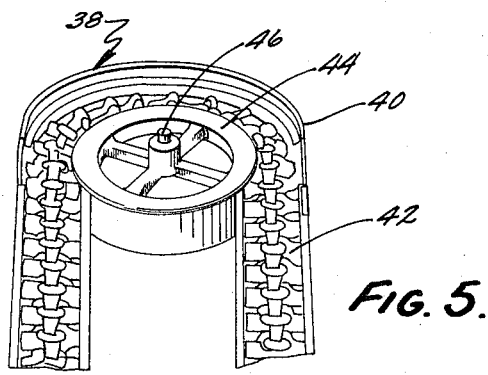
FIG. 5.
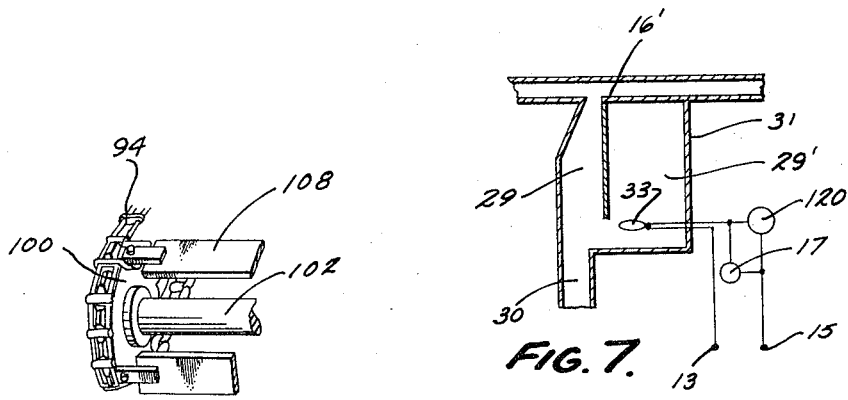
FIG. 6.
FIG. 7.
INVENTORS
RICHARD A. HAGGARD
EDWARD F. BARES
BY
ATTORNEYS

3,301,218
LIVE-BOTTOM BIN AND CHAIN FEED SYSTEM
Richard A. Haggard, Nacogdoches, Tex., and Edward F. Bares, Grand Haven, Mich., assignors to Big Dutchman, Inc., a corporation of Michigan
Filed May 7, 1964, Ser. No. 365,582
3 Claims. (Cl. 119—52)

This invention relates to animal feeding equipment, and more particularly to a hopper system for animal feeding equipment.

Mechanized, automated, feeding apparatus for livestock often incorporates a large, main, outdoor hopper to supply feed to the conveying system. This outdoor hopper is periodically filled with particulate feed to be dispensed through the conveyor day by day, intermittently into the animal houses on an hourly basis. The animal feed in the hopper, to be most effective, should be transferred relatively uniformly from its top to its bottom so that no portion of the feed remains in the hopper unduly long to become stale or caked. However, with present hoppers, the feed often "bridges" excessively over portions of the lower hopper section, causing uneven removal and preventing reasonably uniform outflow. Even with present "live-bottom" hoppers wherein some sort of scraper means moves in the hopper outlet chute, the feed characteristically "hangs-up" in the front of the hopper, between the convergent side walls, and feeds down only from the rear of the hopper.

This undesired "hang-up" is caused repeatedly in present hoppers which include a convergent bottom end configuration and a central outflow gate. These features are presently utilized in accordance with accepted hopper construction techniques.

It is an object of this invention to provide an animal feed hopper system having more uniform down feed and discharge from top to bottom, and with a minimum of feed "bridging" and "hang-up."

Another object of this invention is to provide a live-bottom feed hopper causing more uniform down feed over the cross-sectional area of the hopper, coupled with exact discharge control flow for the volume.

Another object of this invention is to provide a live-bottom hopper with a special continuous conveyor across the entire bottom of the conveyor, underlying the entire feed-containing area of the hopper, to achieve more uniform outflow across the entire width of the hopper, yet protected against excess strain or deformation on the portions of the conveyor extending across the hopper floor.

These and several other objects of this invention will become apparent upon studying the following specification in conjunction with the drawings in which:

FIG. 4 is a fragmentary, enlarged, perspective view of the live-bottom conveyor and its drive mechanism for the hopper;

FIG. 5 is a fragmentary, enlarged, perspective view of a portion of the transfer conveyor that underlies and receives feed from the hopper to carry it to the animal house, as illustrated in FIG. 1;

FIG. 6 is an enlarged, fragmentary view of a portion of the live-bottom conveyor sprocket, chain, and slat combination from FIG. 4; and FIG. 7 is a fragmentary, enlarged, sectional, partially schematic view of one of the gravity chute controls in the animal house in FIG. 1.

Figure 1:
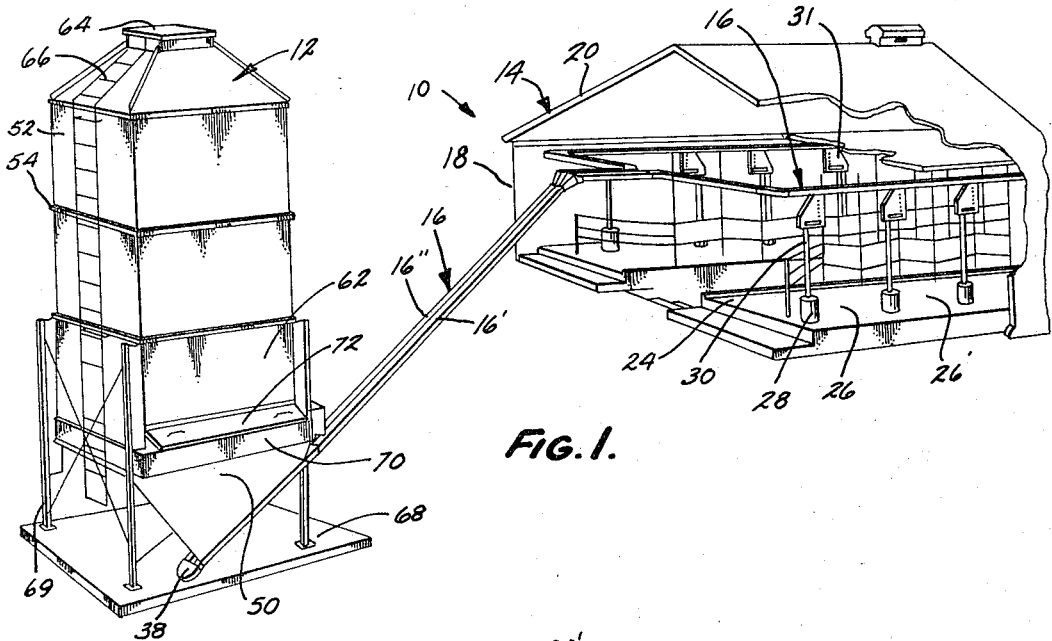
FIG. 1 is a perspective view of the novel hopper shown associated with an animal house.

Referring now specifically to the drawings, the complete feeding system 10 there shown includes a hopper system 12, operably associated with an animal house 14 through the intermediate transfer conveyor 16.

The animal house 14 includes conventional construction for its walls 18 and roof 20. Its interior floor 24 is formed into a plurality of milking stalls 26, 26', etc. in conventional fashion. Each of the milking stalls has its own feed container 28 fed by a gravity downchute tube 30. The gravity chutes are mounted to and beneath an overhead re-circulating portion of the conveyor means 16. The recirculatory transfer conveyor includes a section 16' which carries feed to the house and a return section 16'' back underneath the hopper.

The conveyor 16 includes a conventional covered trough 40 (FIG. 5) and moving conveying means such as a chain 42 of flexibly interconnected feed pushing links. The bends in the conveyor trough and the return loop 38 include the usual guide means such as the pilot wheel 44 mounted on an axis 46 to guide the chain around it. The return assembly 38 illustrated in FIG. 5 is adjacent the receiving boot 50 on hopper 12.

This hopper system includes a vertically elongated housing 52 having four side walls, preferably of generally square cross-sectional configuration. The hopper is normally several feet wide and deep, with typical dimensions being 6 foot by 7 foot by 20 foot.

The hopper construction is formed of vertical sections joined at rib lines 54 by suitable connectors. The four walls, for convenience, will be identified as side walls 56 and 58, and front and back end walls 60 and 62, with wall 62 being the front discharge end wall. The hopper is periodically filled through a top door 64. This door is accessible by a ladder 66. The hopper is supported in an elevated position on a platform 68 such as poured concrete, by a plurality of legs 69.

Figure 2:
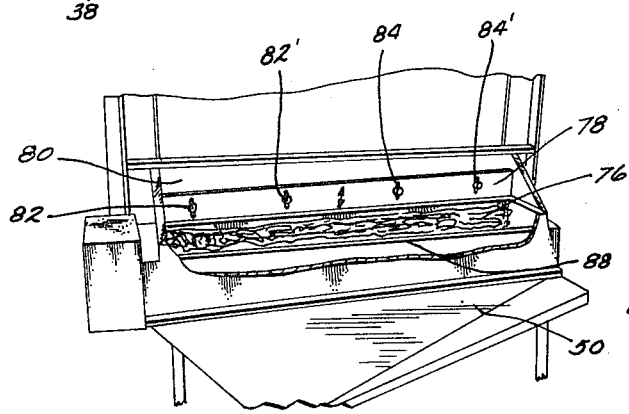
FIG. 2 is an enlarged perspective partially cut-away view of the discharge portion of the bottom of the hopper in FIG. 1.
Figure 3:
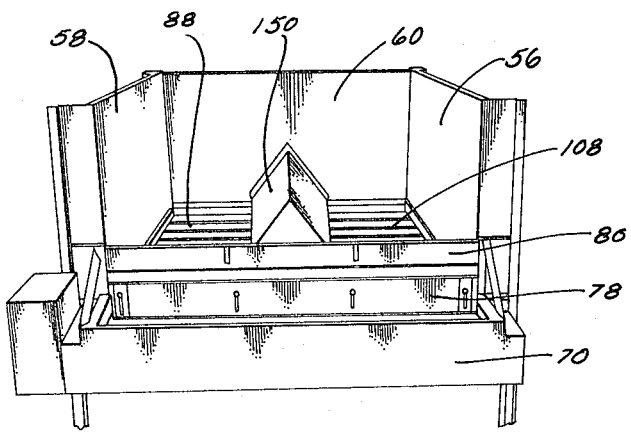
FIG. 3 is an enlarged perspective fragmentary view of the discharge bottom portion of the hopper prior to complete assembly.

Mounted to the discharge wall 62 is an outwardly protruding portion 70 beneath which the hollow receiving boot 50 is mounted. A top cover door 72 is provided on this portion to allow access to be had to the interior thereof, and specifically to the feed discharge opening 76 at the base of wall 62 and adjacent the hopper floor. This opening is controlled by the vertically adjustable discharge control gate 78 (FIGS. 2 and 3).

The discharge opening in wall 62 is more specifically in a rigid support plate 80 across the lower part of wall 62. The gate 78 comprises a plate member bolted to the rigid support 80 by a plurality of bolts 82, 82', etc. These fit through vertically elongated slots 84, 84', etc. to allow the plate to be vertically adjusted when the bolts are loosened. The lower edge of this plate, therefore, moves up and down to determine the spacing from the floor 88 of the hopper. The floor of the hopper covers the entire cross-sectional area of the hopper. The walls are not convergent toward the bottom. Consequently, the square area of the floor is equal to the cross-sectional square area of the hopper at any vertical portion thereof.

Associated with this floor is a laterally moving feed conveying means 90 causing this hopper to be a "live-bottom" hopper. This conveyor means is shown most clearly in FIG. 4. It includes a pair of spaced flexible endless elongated chains 92 and 94 (FIG. 6), or similar belt elements if desired, each of which travel around a pair of guide wheel sprockets, i.e. sprockets 98 for chain 92, and sprockets 100 for chain 94. The chains, therefore, each move the full extent of the hopper from back to front and return, along the side edges of the floor. These sprockets are mounted on shafts, with two sprockets being on opposite ends of the respective shafts 102 and 104. Extending between these chains across the width of the hopper floor is a plurality of elongated slat elements 108. The opposite ends of these slat elements are bolted to the chain (FIG. 6) to travel therewith. Substantially half of the chain is always on the upper surface of hopper floor 88 to move the transverse slats across the upper surface of the floor, as shown in FIGS. 3 and 4. The other half of the slats are beneath the floor as shown at 108' in FIG. 4. When driven toward the discharge outlet, the sliding slats carry a section of feed along the entire bottom with them, to be discharged out the opening beneath the gate as illustrated in FIG. 2. It has been found that the feed moves uniformly across the floor with the slats. The thickness of the moving layer varies directly with the gated outlet opening. The result is excellent uniformity of feed discharge across the extent of the large hopper. The feed thus falls through the boot 50 into distributing conveyor 16 to be carried to gravity downspouts 30 in the house 14.

The live-bottom conveyor 90 is driven in intermittent fashion by a motor and ratchet drive assembly. Referring to FIG. 4, electrical motor 120 mounted in protective housing 122 has an eccentric crank assembly operably connected to its output shaft. This crank assembly includes a disc 124, a plate 126 and a connection rod 128 mounted off-center with respect to the disc to cause the rod to reciprocate upon rotation of the disc. This reciprocation causes oscillatory reciprocation of straddling bracket 130 which extends across the diameter of a ratchet gear 132. Both the bracket and gear are mounted on the end of shaft 104 adjacent the chain sprocket. The extended end of the shaft is rotatably supported by a brace 106. Rod 128 is connected to one end of this oscillatory bracket and a pawl 138 is connected to the opposite end. This pawl engages with the teeth of the ratchet gear in conventional fashion to intermittently drive the ratchet gear in a clockwise direction as illustrated in FIG. 4. This drives the conveyor chain and slats toward the discharge outlet over the top of the floor and returns under the floor.

Since the slats are several feet in length, the weight of the several thousand pounds of feed pressing down upon them would normally tend to deform and bow the pushing slats horizontally in their central portions during feed removal.

The inventors herein have found, however, that by utilizing an inverted V-shaped weight restraining means 150 over the central portion of the slats, extending transversely of the slats, extending from and mounted to the discharge wall and the opposite wall 60, this condition can be eliminated. This V-shaped element is rigidly attached to the walls, elevated approximately four inches above the slats. Thus, the feed can freely move under this housing to fill the entire cross-sectional area on the floor of the hopper, yet leaving the central slat portions free of excess pressure to cause deformation. Accordingly, a continuous layer of feed of uniform thickness is discharged at the discharge opening rather than a void being left in the center. The unit freely operates without interference from the weight of the feed.

Accurate control over the quantity of feed for each interval of conveyor movement across the bottom of the hopper is achieved by simple adjustment of gate 78 to a specified vertical position.

The live-bottom motor 120 is preferably operably connected with activator switches such as mercury switches or the like in the gravity downchutes. A control unit 31 (FIGS. 1 and 7) is positioned between each chute and the transfer conveyor trough. These respond to the absence of feed in any one downspout in the animal house to activate the mechanism. Thus, when the feed in a particular feed container is eaten by an animal, the feed remaining in the downspout moves down the spout. The feed then moves out of chamber 29' and allows mercury switch 33 to drop on its pivot mount and close the circuit. This electrically actuates motor 120 from the source through terminals 13 and 15. The motor then drives the disc 124 which reciprocates rod 128 through the crank assembly. This moves the bracket 130 back and forth to intermittently shift ratchet gear 132 in small arcuate intervals. This intermittently moves the conveyor sprockets, chains, and slats 108 over the floor toward the hopper discharge outlet. The feed is pushed through the gated outlet in a layer of controlled depth into boot 50, and thus into conveyor 16. The drive motor 17 for conveyor 16 is also actuated by switch 33 so that the feed is transferred into the downchutes until they fill sufficiently to raise the switch to open the circuit.

Use of this apparatus has shown its complete dependability and effective automated operation. Various additional advantages not specifically recited above will undoubtedly occur to those in the field upon studying the foregoing form of the invention. Also, various minor structural modifications could conceivably be readily made to the preferred illustrated structure to suit a particular type of feed, animal house, hopper dimensions, or other factors, without departing from the inventive concept set forth. Consequently, this invention is not to be limited merely to the specific preferred form illustrated but only by the scope of the appended claims and the reasonably equivalent structures to those defined therein.

We claim:

1. An animal feed system for an animal house comprising: an outdoor supply hopper, an animal house, and a recirculatory transfer conveyor extending from said hopper into said house, including motor drive means; said recirculatory transfer conveyor including two parallel trough sections mounted directly adjacent each other and connected together by a direction changing corner at one end, said parallel trough sections being connected to divergent trough sections diverging from said two parallel trough sections and making a continuous circuit into said animal house; an endless chain riding in said trough sections, said chain being driven by said motor drive means; a plurality of gravity fed downchutes in said house attached to said transfer conveyor and communicating with animal feeding devices accessible to animals; feed operated control switch means on said chutes; said hopper including a vertically elongated housing having a generally uniform cross-sectional area over its vertical extent; said housing having four walls and an underlying floor of the same cross-sectional area as the vertical extent of said housing; a discharge feed-receiving boot extending the full width of one end wall and said floor and extending downwardly to and in communication with one of said two parallel trough sections; an elongated discharge outlet above said boot extending the full length of said hopper end wall; a continuous discharge conveyor extending the full area over said floor and positioned to travel on and across the surface of said floor toward said discharge boot and return under the level of said floor in the opposite direction; and drive means operably connected to said discharge conveyor to push a uniform layer of feed from the bottom of said hopper through said outlet; and said control switch means being electrically connected with both of said drive means to actuate them when actuated by lack of fed to fill said downchutes automatically.

2. An animal feed system for an animal house comprising: an outdoor supply hopper, an animal house, and a recirculatory transfer conveyor extending from underneath said hopper into said house, including motor drive means; said recirculatory transfer conveyor including two parallel trough sections mounted directly adjacent each other and connected together by a direction changing corner at one end, said parallel trough sections being connected to divergent trough sections diverging from said two parallel trough sections and making a continuous circuit into said animal house; an endless chain riding in said trough sections, said chain being driven by said motor drive means; a plurality of gravity fed downchutes in said house attached to said transfer conveyor and communicating with animal feeding devices accessible to animals; feed operated control switch means on said chutes; said hopper including a vertically elongated housing having a generally uniform cross-sectional area over its vertical extent; said housing having four walls and an underlying floor of the same cross-sectional area as the vertical extent of said housing; a discharge feed-receiving boot extending the full width of one end wall and said floor and extending downwardly to and in communication with one of said two parallel trough sections; an elongated discharge outlet above said boot extending the full length of said hopper end wall; a continuous discharge conveyor extending the full area over said floor and positioned to travel on and across the surface of said floor toward said end wall of said discharge boot from the opposite end wall and return under the level of said floor in the opposite direction; an inverted V-shaped weight restraining means mounted and extending between said end walls adjacent to and above the central portion of said conveyor and being of a substantial width, and being downwardly divergent toward said conveyor; and drive means operably connected to said discharge conveyor to push a uniform layer of feed from the bottom of said hopper through said outlet; and said control switch means being electrically connected with both of said drive means to actuate them when actuated by lack of feed to fill said downchutes automatically.

3. An animal feed system for an animal house comprising: an outdoor supply hopper, an animal house, and a recirculatory transfer conveyor extending from underneath said hopper into said house, including motor drive means; said recirculatory transfer conveyor including two parallel trough sections mounted directly adjacent each other and connected together by a direction changing corner at one end, said parallel trough sections being connected to divergent trough sections diverging from said two parallel trough sections and making a continuous circuit into said animal house; an endless chain riding in said trough sections, said chain being driven by said motor drive means; a plurality of feeder devices accessible to animals; said transfer conveyor communicating with said animal feeding devices; said hopper including a vertically elongated housing having a generally uniform cross-sectional area over its vertical extent; said housing having four walls and an underlying floor of the same cross-sectional area as the vertical extent of said housing; a discharge feed-receiving boot extending the full width of one end wall and said floor and extending downwardly to and in communication with one of said two parallel trough sections; an elongated discharge outlet above said boot extending the full length of said hopper end wall; a continuous discharge conveyor extending the full area over said floor and positioned to travel on and across the surface of said floor toward said end wall of said discharge boot from the opposite end wall and return under the level of said floor in the opposite direction; an inverted V-shaped weight restraining means mounted and extending between said end walls adjacent to and above the central portion of said conveyor and being of a substantial width, and being downwardly divergent toward said conveyor; and drive means operably connected to said discharge conveyor to push a uniform layer of feed from the bottom of the said hopper through said outlet; and control switch means associated with said feeder devices and electrically connected with both of said drive means to actuate them in response to the amount of feed in said feeder devices.

References Cited by the Examiner

UNITED STATES PATENTS

| 1,547,686 | 7/1925 | Rieff | 214—83.36 |
| 1,752,549 | 4/1930 | Beardsley et al. | |
| 2,221,266 | 11/1940 | Roach | 275—6 |
| 2,340,983 | 2/1944 | Pfeiffer et al. | 198—58 X |
| 3,033,163 | 5/1962 | Hostetler et al. | 119—52 |

SAMUEL KOREN, *Primary Examiner.*

HUGH R. CHAMBLEE, *Examiner.*